Feb. 5, 1957 D. A. ARMSTRONG 2,780,331
OUTBOARD MOTOR WITH SPRING-RELEASE CLUTCH CONTROL
Filed Sept. 14, 1953 3 Sheets-Sheet 1
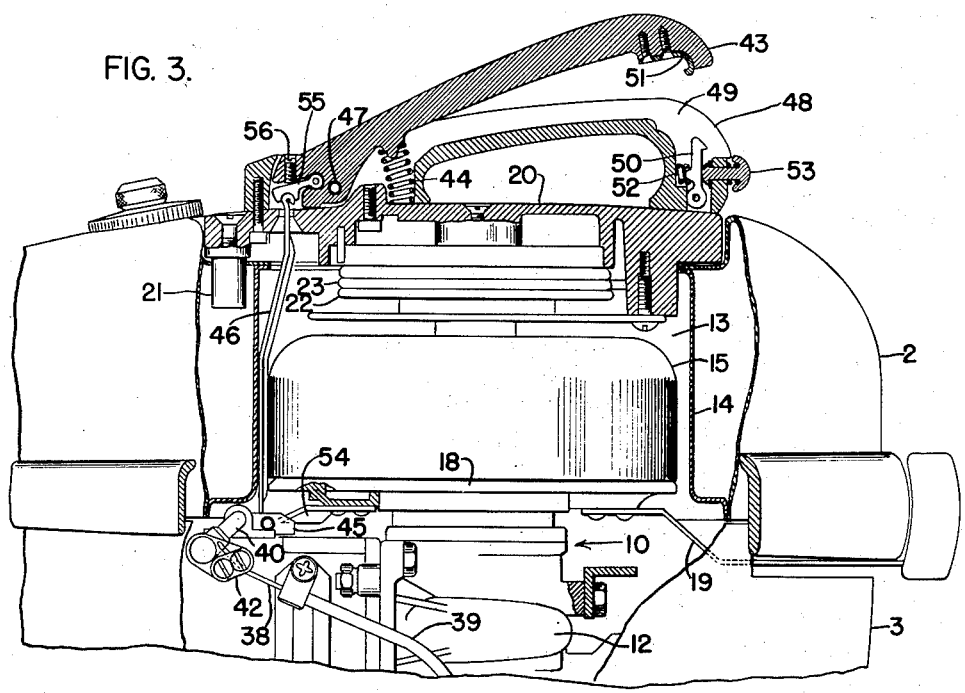
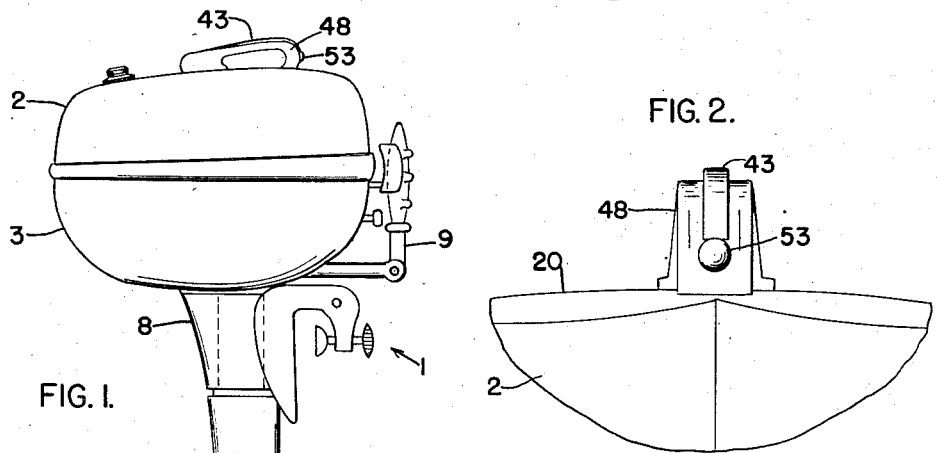
INVENTOR.
DANIEL A. ARMSTRONG
BY
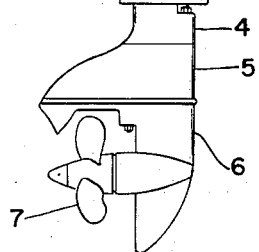
Attorneys Feb. 5, 1957  D. A. ARMSTRONG  2,780,331
OUTBOARD MOTOR WITH SPRING-RELEASE CLUTCH CONTROL
Filed Sept. 14, 1953  3 Sheets-Sheet 2
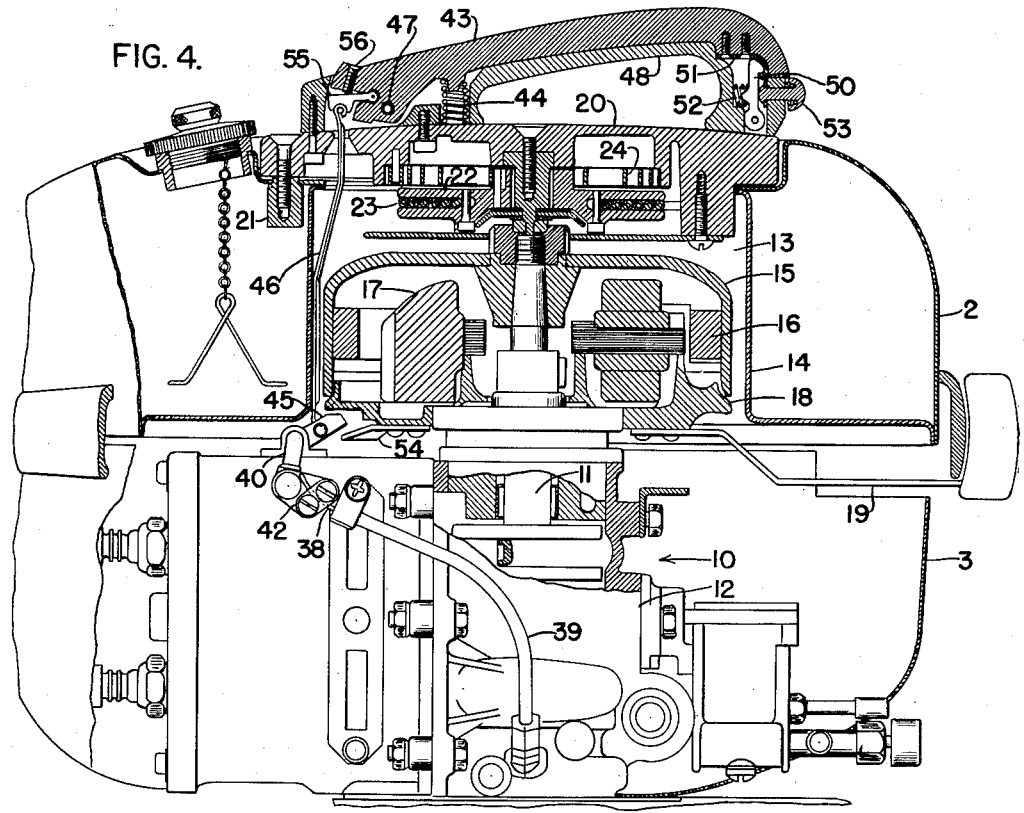
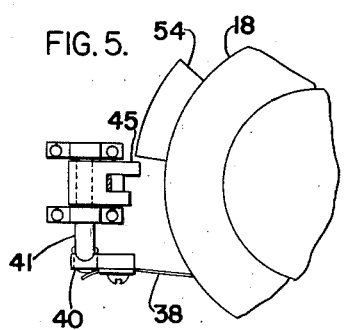
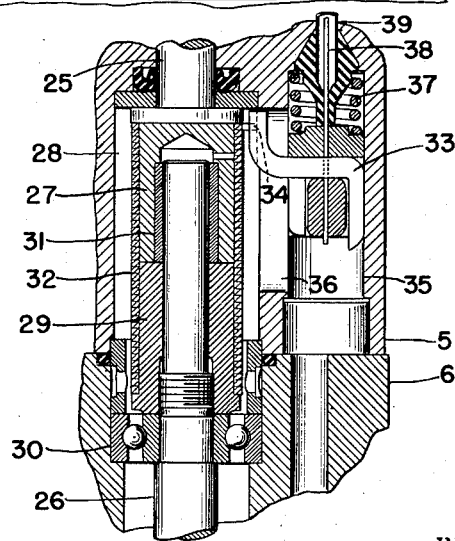
*INVENTOR.*
DANIEL A. ARMSTRONG
BY
Andrus & Sceales
Attorneys Feb. 5, 1957 D. A. ARMSTRONG 2,780,331
OUTBOARD MOTOR WITH SPRING-RELEASE CLUTCH CONTROL
Filed Sept. 14, 1953 3 Sheets-Sheet 3

*INVENTOR.*
DANIEL A. ARMSTRONG
BY
Andrus & Sceales
Attorneys

United States Patent Office 2,780,331
Patented Feb. 5, 1957

2,780,331

OUTBOARD MOTOR WITH SPRING-RELEASE CLUTCH CONTROL

Daniel A. Armstrong, Thiensville, Wis., assignor to Kiekhaefer Corporation, Cedarburg, Wis., a corporation of Wisconsin Application September 14, 1953, Serial No. 379,795

7 Claims. (Cl. 192—.07)

This invention relates to outboard motors and particularly to the clutch control mechanism for effecting the selective engagement and disengagement of the clutch which connects the engine and the propeller shaft whereby the engine may be operated without rotation of the propeller.

The invention provides an improved clutch control for outboard motors including a push-button spring release which disengages the clutch unless the engine is operating too fast; interlocking means between the spring release and the engine speed control which delays disengagement of the clutch until a reduction of engine speed; and a lever having a substantial mechanical advantage providing for re-engagement of the clutch and re-setting of the spring release upon movement to a recessed position safe from mishandling while the engine is in operation with the clutch engaged.

An object of the invention is to provide for the improved safety of the operator and the occupants of the boat in the operation of the clutch control.

Another object of the invention is to limit the speed adjustment of the motor when in neutral.

Another object is to provide for the more positive engagement and disengagement of the clutch mechanism.

A further object is to provide for the disengagement of the clutch by means immediately operative when the engine is operating within a predetermined safe speed and which become automatically operative to disengage the clutch upon reducing engine speed to within said range.

Another object of the invention is to provide a clutch control handle mounted on the starter cover of an outboard motor so as to be readily removable therewith as in servicing the starter mechanism.

Another object is to provide a clutch control handle which operates with substantial or identical manipulation irrespective of the steering position of the motor.

The drawings furnished herewith illustrate the best mode of carrying out the invention as presently contemplated and set forth hereinafter.

In the drawings:

Figure 1 is a side elevation of the outboard motor showing the relative location of the clutch control handle;

Fig. 2 is a front elevation of the top of the outboard motor showing the control lever in the drive position;

Fig. 3 is a cross-sectional view taken longitudinally of the upper end of the motor showing the control lever in the neutral position;

Fig. 4 is a view similar to Fig. 3 showing the control lever in the drive position and shows parts of the outboard motor engine broken away and sectioned;

Fig. 5 is a top plan view of a part of the interlocking speed and clutch control mechanism shown in Figs. 3 and 4;

Fig. 7 is a transverse sectional view taken through the clutch control mechanism shown in the neutral position.

Figure 6:
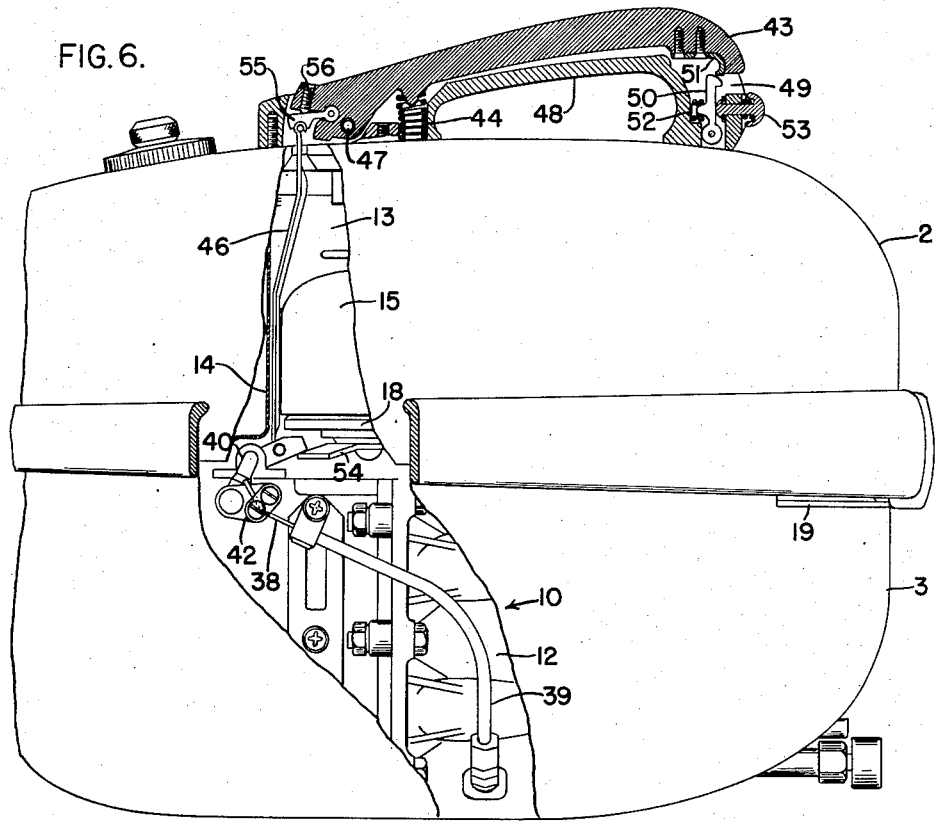
Fig. 6 is a view similar to Figs. 3 and 4 showing the control lever released but held against movement and preventing disengagement of the clutch by the speed control mechanism.

The outboard motor unit shown in Figure 1 is provided with the clamp bracket assembly 1 for securement to the transom of a boat, not shown. The upper end of the motor unit including the fuel tank 2 and cowl 3 is supported by the drive shaft housing comprising the upper and lower members 4 and 5, respectively. The lower propeller unit 6 is fixed to the lower end of driveshaft housing member 5 and includes the propeller 7. The upper end of drive-shaft housing member 4 is rotatable within the swivel bracket 8 of bracket assembly 1 on a vertical axis for steering of the boat, not shown, by turning the motor unit as by means of the tiller 9.

The engine 10 of the outboard motor unit is enclosed by the cowl 3 and includes the crankshaft 11 which extends upwardly from the crankcase 12 concentrically of and within the vertical opening 13 formed by the cylindrical wall 14 of tank 2. The flywheel 15 fixed to the upper end of crankshaft 11 within opening 13 carries the permanent magnets 16 which form the rotor of the engine magneto 17 mounted on the circular plate 18 beneath the flywheel. Plate 18 is mounted on the upper end of crankcase 12 for rotational adjustment on the axis of crankshaft 11 as by means of the lever 19 to effect the speed control of the engine.

The plate 20 covering the flywheel 15 is secured at spaced points to the upper side of tank 2 as by the screw fitting 21 located adjacent to wall 14 and carries the rewind starting device which includes the reel 22 carrying the rope 23 wound thereon. The rotation of reel 22 by pulling rope 23 causes the engagement of ratchet means carried by the reel and crankshaft 11 to rotate the latter. The helical spring 24 provides for rewinding rope 23 on reel 22 when released.

Suitable shaft drive means for the transmission of power from engine 10 to propeller 7 includes the drive shaft 25 connected to crankshaft 11 to rotate therewith and the shaft 26 selectively connected to shaft 25 by any suitable clutch means.

Figure 8:
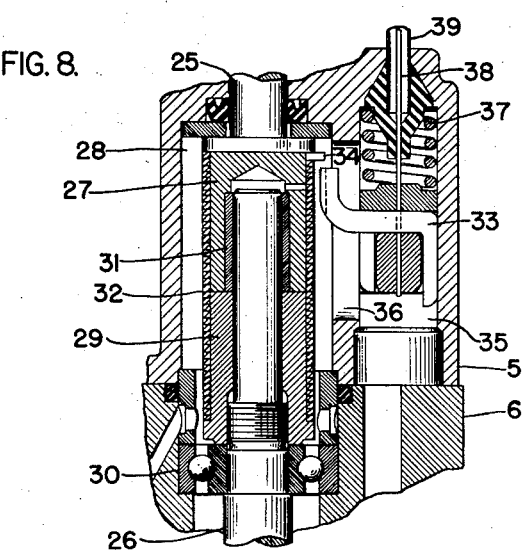
Fig. 8 is a view similar to Fig. 7 showing the clutch in the drive position.

The clutch shown in Figs. 7 and 8 includes the cylindrical drive member 27 carried by the lower end of shaft 25 within the chamber 28 formed in drive-shaft housing member 5, and the driven collar 29 mounted on shaft 26 immediate to and in alignment with member 27. Shaft 26 is carried by the bearing 30 in drive-shaft housing member 5 and projects through collar 29 into the bushing 31 in member 27 for supporting the latter and the lower end of shaft 25.

The coil clutch-spring 32 is mounted on member 27 and collar 29 and is wound in a direction so that rotation of shaft 25 winds spring 32 to contract the same and effect the driving connection of member 27 and collar 29.

The release of spring 32 is selectively effected by the S-shaped release bar 33 which is movable into interference with the projecting upper end 34 of spring 32. Upon such interference the rotation of member 27 tends to expand the spring 32 and effects their relative disengagement whereby engine 10 may be running without driving propeller 7.

Release bar 33 is slidably carried in the bore 35 formed in member 5 adjacent to chamber 28, and projects through the slot 36 providing communication between the same. Bar 33 is normally retained in a lower position out of interference with spring 32 by the spring 37 seated against the upper end of bore 35. Spring 37 effects clutch engagement of the drive means of the outboard motor unit and yields to the operation of the clutch control to allow clutch disengagement as will be described. The construction of the clutch as shown and described is similar to that shown and claimed in the present inventor's copending application, Serial No. 420,634, filed April 2, 1954, for Spring Clutch for Outboard Motors and the like.

The lower end of control cable 38 is fixed to release bar 33 and operates within the casing 39 which extends upwardly through members 4 and 5 of the drive shaft housing and terminates at one side of engine 10 adjacent to the crank 40 having the shaft 41 on the top of the engine adjacent to stator plate 18. The end of cable 38 is secured to crank 40 by the clamp 42 which provides for the adjustment of the movement of bar 33 within the range of movement of crank 40. The rotation of shaft 41 operates through crank 40 and cable 38 to move bar 33 into interference with clutch spring 32 and is effected selectively by the operation of the lever 43 to disengage the clutch and stop the propeller 7 with engine 10 continuing to run.

Lever 43 is activated by the spring 44 and is connected to the arm 45 on shaft 41 by the push-rod 46 which extends through plate 20 and between wall 14 and flywheel 15.

Lever 43 is pivotally movable on the cross-pin 47 extending through the handle 48 mounted on top of plate 20 and is adapted to fit substantially flush within the recess 49 formed within handle 48. The upward movement of lever 43 out of recess 49 is effected by spring 44 which is seated within handle 48 and operates against clutch spring 37 to effect rotation of shaft 41 and clutch disengagement as described. In depressing lever 43, allowing spring 37 to move bar 33 downwardly to effect clutch engagement, spring 44 is compressed and again energized.

Lever 43 is of substantial length providing a substantial mechanical advantage in compressing spring 44 and is adapted to be secured within recess 49 by the latch 50 fitted within handle 48 to engage the plate 51 at the forward end of lever 43. Latch 50 is held by spring 52 in a position to hold lever 43 against movement on pin 47 upwardly out of recess 49 and is adapted to be released by the button 53 which is carried in handle 48.

In the operation of the motor with lever 43 secured by latch 50, spring 32 is in engagement for driving propeller 7 and spring 44 is compressed within handle 48. Upon release of lever 43 by pushing button 53, spring 44 lifts the lever which pushes down on rod 46 and moves the free end of arm 45 downwardly into interference with the control sector 54 carried adjacent thereto by plate 18 which is movable to provide for the speed control of engine 10.

Sector 54 is located so that in any position for a speed less than a given maximum, the sector is clear of arm 45 permitting spring 44 to operate against spring 37 of the clutch mechanism and effect immediate clutch disengagement as desired.

In the position of clutch disengagement as shown in Fig. 3, arm 45 is disposed in the path of sector 54 as the same will appear in Fig. 5 preventing adjustment of plate 18 to any speed higher than the maximum referred to.

In the operation of the motor at any such higher speed, sector 54 is positioned beneath arm 45 allowing lever 43 to be released as by pushing button 53 but preventing further movement of the lever and normal clutch disengagement. The upper face of sector 54 is fairly smooth allowing the sector to slide beneath arm 45 and plate 18 to be adjusted to any lower or higher speed.

According to the invention, the adjustment of plate 18 to a speed below the maximum referred to by the manipulation of lever 19 moves sector 54 from beneath arm 45 whereby the clutch mechanism is released and spring 44 effects clutch disengagement without further action on the port of the motor operator.

The automatic clutch disengagement upon reducing speed provides a factor of safety as where the operator may be distracted and in attempting to shift to neutral will do so without first reducing speed. The operator is only required to operate the shift mechanism initially and if the same is locked by the speed control a reduction of speed only is required and the operator need not try the shift mechanism again to effect clutch disengagement or shifting into "neutral."

Spring 44 remains energized at all times while the clutch is engaged, and upon pushing button 53 effects clutch disengagement either immediately if the motor is not running too fast or immediately upon reducing speed. Lever 43 is located on the top of the motor for ease of operation in any steering position of the motor to effect clutch re-engagement and re-energizing of spring 44 and is otherwise recessed so as to be protected against mishandling in the normal operation of the motor.

The insert 55 is pivotally adjustable within a corresponding recess in lever 43 and receives the upward thrust of the rod 46. Insert 55 is positioned by the screw 56 which permits adjustment of the effective length of rod 46. Spring 37 normally operates to lift rod 46 and is only seated at its upper end in insert 55 to be pushed downwardly by spring 44 operating lever 43 so that removal of plate 20 with handle 48 and lever 43 is readily allowed.

The entire action of the clutch is effected by springs 37 and 44 so that no forcing of any operating parts is possible in cases of their binding. If the mechanism is frozen in neutral and cannot be shifted to the drive position by the action of spring 37, lever 43 may be depressed without effect as insert 55 will merely be lifted from the upper end of rod 46. If the mechanism is frozen in drive, the recessed location of lever 43 prevents manual operation of the lever and forcing of the mechanism.

Various modes of carrying out the invention are contemplated as within the scope of the following claims particularly pointing out and distinctly claiming the subject matter which is regarded as the invention.

I claim:

1. In an outboard motor having transmission and clutch means including a shiftable clutch control member for selective operation of the motor in neutral and drive, a control lever connected to said control member and mounted at the upper end of the motor for manipulation by the motor operator, a spring biasing said lever to the neutral position, a latch disposed to secure said lever in the drive position with said spring compressed, manual release means engageable with said latch to move the same and release said lever and to effect disengagement of said clutch, the manual movement of said lever to the latched drive position being effective to re-energize said spring for subsequent operation by said release means, said motor having a recess at the top thereof to receive said lever in said drive position whereby the lever is normally protected against mishandling.

2. In an outboard motor having an adjustable speed control element and transmission clutch means connecting the engine and propeller unit and including a shiftable clutch control member for selective operation of the motor in neutral and drive, a clutch control lever mounted on the motor for manipulation by the motor operator, a spring biasing said lever to a raised position, a manually releasable latch disposed to secure said lever in a lower position, adjustable means connecting said lever and control member to effect engagement of the clutch means upon movement of the lever to a raised position and disengagement of said clutch upon manual movement of said lever to a lower latched position whereby said spring is re-energized, and abutment means associated with said speed and clutch control elements and relatively engageable whereby the movement of said lever and shifting of the clutch control to neutral is prevented at excessive engine speed and until a reduction of such speed by adjustment of the speed control element.

3. In an outboard motor having an adjustable speed control element and transmission clutch means connecting the engine and propeller unit and including a clutch control element selectively shiftable to drive and neutral positions, a manually operable clutch control member movable to corresponding drive and neutral positions, a spring biasing said member for movement to the neutral position, a latch engageable with said member to secure the latter in the drive position, means connecting said clutch control element and member and including an abutment arm movable therewith to corresponding positions, said latch being releasable whereby said spring operates to move said member and arm and shift said clutch control element to the neutral position whereby said arm is disposed to be engaged by said speed control element to preclude adjusting the speed of the engine above a given maximum, said clutch control element being shiftable to the drive position upon manual movement of said control member into re-engagement by said latch whereby said abutment arm is moved to allow said speed control element to be adjusted for increasing the speed of the motor above the maximum referred to.

4. The invention as defined in claim 3 wherein said abutment arm is prevented from movement by said spring upon release of said latch until the prior adjustment of said speed control element to a position below said given maximum speed, such adjustment being thereupon automatically operative to effect shifting of said clutch control element to neutral.

5. In an outboard motor having an adjustable speed control element and transmission clutch means connecting the engine and propeller unit and including a shiftable clutch control member for selective operation of the motor in neutral and drive, a clutch control lever mounted on the motor for manipulation by the motor operator and connected to said control member for movement to corresponding positions, a spring biasing said lever to the neutral position, a manually releasable latch disposed to secure said lever in the drive position, and abutment means associated with said speed and clutch control elements and relatively engageable whereby the movement of said lever and shifting of the clutch control to neutral is prevented at excessive engine speeds and until a reduction of such speed by adjustment of the speed control element.

6. In an outboard motor having an adjustable speed control element and transmission clutch means connecting the engine and propeller unit and including a clutch control element selectively shiftable to drive and neutral positions, a manually operable clutch control member movable to corresponding drive and neutral positions, a spring biasing said member for movement to the neutral position, a manually releasable latch engageable with said member to secure the latter in the drive position, means connecting said clutch control element and member and including an abutment arm movable therewith to corresponding positions, said arm being disposed upon shifting of said clutch control element to the neutral position whereby the arm is disposed to be engaged by said speed control element to preclude adjusting the speed of the engine above a given maximum, said clutch control element being shiftable to the drive position upon manual movement of the member into re-engagement with said latch whereby said abutment arm is moved to allow said speed control element to be adjusted for increasing the speed of the motor above the maximum referred to and said abutment arm is prevented from movement by said spring upon release of said latch, said spring being automatically operative to effect shifting of said clutch control element to neutral upon the adjustment of said speed control element to a position below said given maximum speed.

7. In an outboard motor having a movable speed control element and transmission clutch means connecting the engine and propeller unit and including a clutch control element selectively shiftable to drive and neutral positions, an upper cover plate secured to the motor and removable for access thereto and including a handle for manipulation of the motor, a clutch control lever fitting flush within a recess extending lengthwise in said handle and pivotally mounted adjacent one end thereof, a spring biasing said lever for movement of the other end thereof to a raised position out of said recess, a latch carried by said handle and engageable with said other end of the lever to secure the latter in a lower flush position, crank means operatively connected to said clutch control element and including an abutment arm, rod extending from said arm upwardly through an opening in said plate to engage said first named end of said lever, said latch having a manually operative device for release of said lever whereby said spring operates to depress said rod and said abutment to a corresponding lower position and shift said clutch control element to the neutral position, an abutment member carried by said speed control element and disposed to engage said abutment arm in said lower position to preclude adjusting the speed of the engine above a given maximum, a second spring operative to shift said clutch control element to drive position and said abutment arm to a corresponding upper position upon depressing said lever into the recess of said handle, said abutment arm in said upper position allowing said abutment member to move with said speed control element for increasing the speed of the motor above the maximum referred to, said abutment member being then disposed beneath said abutment arm to prevent movement of the latter by said first spring upon release of said lever whereupon the movement of said speed control element to a position below said given maximum speed is automatically operative to effect shifting of said clutch control element to neutral.

References Cited in the file of this patent

UNITED STATES PATENTS

| | | |
|---|---|---|
| 373,455 | Gould | Nov. 22, 1887 |
| 951,316 | Heinrich | Mar. 8, 1910 |
| 1,423,108 | Heany | July 18, 1922 |
| 2,080,079 | Johnson | May 11, 1937 |
| 2,082,058 | Irgens | June 1, 1937 |

FOREIGN PATENTS

| | | |
|---|---|---|
| 382,088 | Great Britain | Oct. 20, 1932 |